(No Model.)
W. FRIEND.
RUBBER ERASER.
No. 443,616.  Patented Dec. 30, 1890.
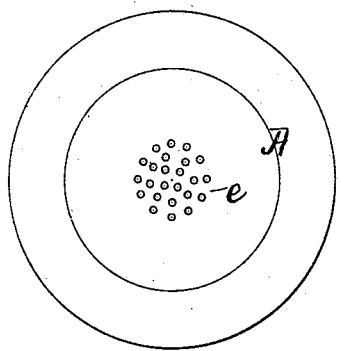
*Fig 1.*
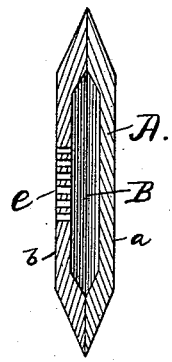
*Fig. 2.*
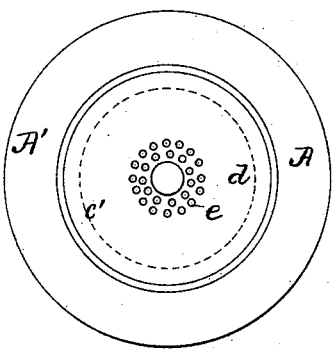
*Fig. 3.*
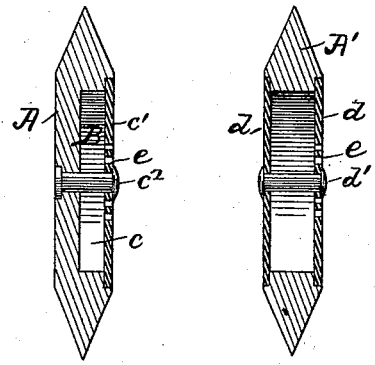
*Fig. 4.*  *Fig. 5.*
Attest:
Geo. Benjamin
H. T. Fales.
Inventor:
William Friend
By Arden S. Fitch
atty

UNITED STATES PATENT OFFICE.

WILLIAM FRIEND, OF NEW YORK, N. Y.

RUBBER ERASER.

SPECIFICATION forming part of Letters Patent No. 443,616, dated December 30, 1890.

Application filed May 21, 1890. Serial No. 352,578. (No model.)

*To all whom it may concern:*

Be it known that I, WILLIAM FRIEND, of the city, county, and State of New York, a citizen of the United States, have invented certain new and useful Improvements in Rubber Erasers, of which the following is a full, clear, and exact description, reference being had to the accompanying drawings, forming part of this specification.

My invention relates to india-rubber erasers; and it consists in a rubber eraser which is chambered and is provided with fine or small apertures, singly or in series, in the chamber wall or walls, communicating from said chamber to the exterior of the eraser body together, preferably, with a textile or absorbent material inclosed in said chamber, substantially as and for the purpose hereinafter set forth.

Figure 1 is a side elevation of a rubber eraser containing my invention. Fig. 2 is a cross-section of the same. Figs. 3, 4, and 5 are respectively a side elevation and central cross-section of an eraser, showing a modified form of the invention.

In carrying out my invention I form or constitute a chamber in the body of the eraser, and I provide an aperture or apertures in the chamber wall or walls and communicating from said chamber to the exterior of the eraser-body.

A is the eraser, in the body of which is constituted the chamber B. The chamber may be constituted wholly in and inclosed by the india-rubber body of the eraser, as illustrated in Figs. 1 and 2, by casting a similar or corresponding recess in one face of each of two halves or disks $a$ and $b$ of india-rubber, and then bringing the said recessed faces of the disks or halves together and cementing the disks at their united edges, as shown in said Figs. 1 and 2; or the said chamber may be formed by recessing, as at $c$, Figs. 3 and 4, a face of the india-rubber body of the eraser and closing the mouth of the recess by a plate or lid $c'$, which may be held in place by a rivet $c^2$ passed transversely through the plate and eraser-body; or it may be desirable to constitute the eraser of a rubber rim-piece A', clamped between two plates $d$, which are held together by a rivet $d'$, as shown in Fig. 5, the chamber A being constituted by the space inclosed by the rim-piece and plates.

At $e$ are apertures, one or more, which are formed in the wall or walls of the chamber A, and which communicate from said chamber to the exterior of the eraser-body, as shown.

I have shown in the drawings a circular eraser; but it is evident that the form of the eraser-body may be varied from that illustrated without departure from the described essential features of my invention.

I find it desirable to provide a number of the apertures $e$ in the chamber-wall and to group said apertures at or about the center of the eraser-body in one side wall only of the body, as shown. When the apertures are thus constituted and arranged, they may be covered by the thumb or fingers of the user when the eraser is grasped in the hand for use in erasing, and the escape of the contents of the chamber, as hereinafter set forth, be thus prevented during the use of the eraser, while when the eraser is not in use it may lie at rest upon its imperforate side. I prefer to constitute the plates $c'$ and $d$ of some rigid material, such as wood, metal, celluloid, &c., as a desirable holder is thus given to the eraser.

Within the described chamber A there may be inclosed a sack or piece of felt or cloth or similar textile or absorbent material, as shown at C, Fig. 1, containing or saturated with a perfume, the odor of which will escape through the apertures $e$ and may impart a scent to stationery with which the eraser is in proximity—as, for example, in a writing case or desk.

I make no claim herein to an eraser having a chambered body and provided with apertures, one or more, at or about the center of one of the side walls of said chambers; but I hereby reserve the same herefrom and have made it the subject-matter of a claim in a separate application for Letters Patent, Serial No. 352,579, filed by me simultaneously herewith.

What I claim as my invention, and desire to secure by Letters Patent, is—

1. A rubber eraser which is chambered and is provided with apertures, singly or in series, in a wall of said chamber and communicating from said chamber to the exterior of the eraser-body, together with a textile or absorbent material inclosed in said chamber, substantially as and for the purpose set forth.

2. A rubber eraser composed of two recessed rubber plates or disks united flatwise at their recessed sides to constitute a chamber within the eraser, and one or both of said plates being provided with apertures, singly or in series, communicating from said chamber to the exterior of the eraser-body, substantially as and for the purpose set forth.

3. A rubber eraser composed of an india-rubber plate having a recess in a face thereof, a lid which closes the mouth of said recess, and apertures, one or more, provided in a wall of said chamber and communicating therefrom to the exterior of the eraser-body, substantially as and for the purpose set forth.

4. A rubber eraser composed of an india-rubber rim, plates between which said rim is clamped and held, and apertures, one or more, in said plates and communicating from the chamber inclosed by said rim and plates with the exterior of the eraser, substantially as and for the purpose set forth.

WILLIAM FRIEND.

Witnesses:
A. T. FALES,
C. W. BENJAMIN.